July 11, 1961 C. BOTHOS 2,991,967
EYEGLASS HOLDER BLOCK
Filed Nov. 20, 1958
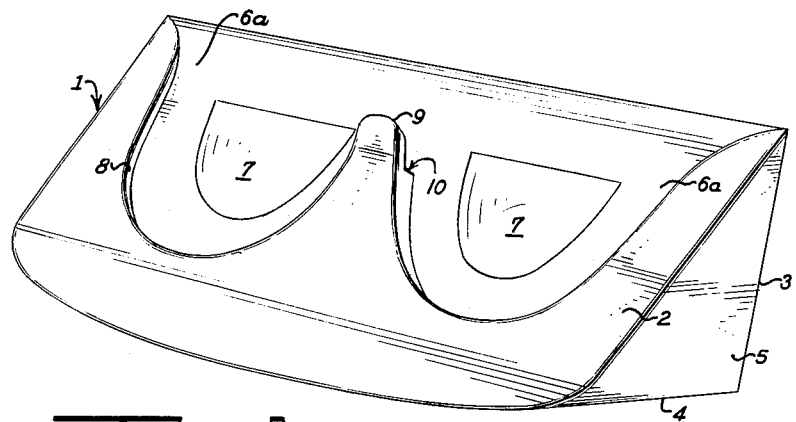
Fig. 3
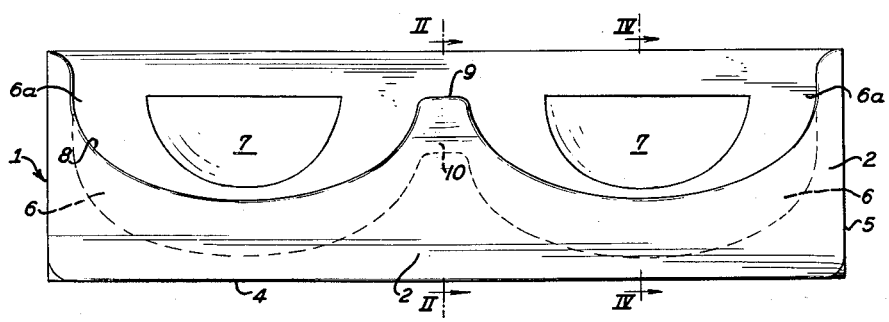
Fig. 1
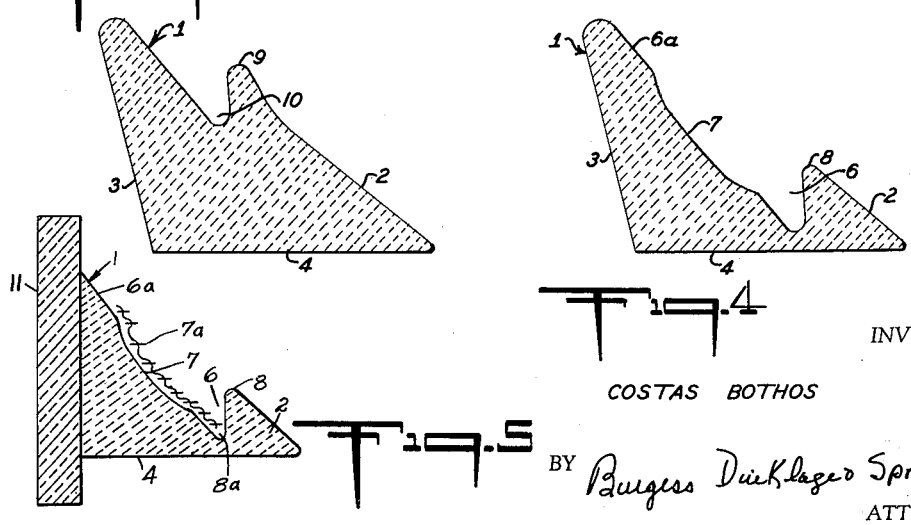
Fig. 2    Fig. 4
Fig. 5
INVENTOR
COSTAS BOTHOS
BY Burgess Dinklage Sprung
ATTORNEYS

United States Patent Office 2,991,967
Patented July 11, 1961

---

2,991,967
EYEGLASS HOLDER BLOCK
Costas Bothos, 47—13 48th Ave., Woodside, L.I., N.Y.
Filed Nov. 20, 1958, Ser. No. 775,168
11 Claims. (Cl. 248—195)

The present invention relates to a holding device for eyeglasses and more particularly to a wedge-shaped eyeglass holder, containing substantially arcuate spaced slots, which may be attached to any supporting surface or used as a convenient portable device.

It is an object of the invention to provide an eyeglass holder of sturdy wedge-shaped construction which is visually indicative of its intended function and which is conveniently at hand and ready for use. It is another object of the invention to provide a holder of the aforementioned type which is safe and durable in use and simple in construction.

One of the foremost advantages of the invention is the convenient availability of a holder for eyeglasses which by its nature and design enables the user to remain aware of their presence and avoid mislaying or forgetting them.

Consequently, the eyeglass holder of the present invention may find ready application in lavatories, barber shops, beauty salons, dressing rooms, as well as in various other places where it is frequently required or desired that a person remove his glasses for at least a short period.

The invention is further illustrated by the accompanying drawing in which:

FIG. I is a front elevation of an embodiment of the invention;

FIG. II is a sectional view, taken along line II—II of FIG. I;

FIG. III is a view in perspective of an embodiment of the invention;

FIG. IV is a sectional view taken along line IV—IV of FIG. I; and

FIGURE V is a sectional view of a further embodiment of the invention illustrating the manner in which the eyeglass holder may be attached to a wall tile.

Referring to the accompanying drawing, 1 is a wedge-shaped block having a forward face 2, rear wall 3, bottom wall 4, and side walls 5. Wedge-shaped block 1 is preferably made of metal, plastic or wood although it will be understood that any material suitable for this purpose may be employed.

Disposed within face 2 of block 1 are arcuate slots 6, 6 downwardly directed in a common plane and spaced from one another a slight distance. In the back wall 6a of face 2, concave indentations 7, 7 are preferably provided to conveniently receive the corresponding convex side of each lens of a pair of eyeglasses. Each slot 6 is provided with an arcuate slot rim 8 spaced from the corresponding portions of back wall 6a, so as to prevent a pair of eyeglasses disposed within the holder from inadvertently slipping out.

Each arcuate slot rim 8 terminates at its outer end adjacent the corresponding upper corner of face 2 and terminates at its inner end in an upwardly extending projection 9 extending across the space between slots 6, 6, generally at the center of face 2. Behind projection 9 is situated a shallow bridge seat 10, adapted to receive the center bridge of a pair of eyeglasses thereon.

Thus, in accordance with the construction of the present invention, a pair of eyeglasses may be readily placed within the holder, with each lens surface positioned against the corresponding back wall of the face, with its center bridge resting across the bridge seat and behind the upwardly extending projection, and with each lower rim located behind the corresponding arcuate slot rim and seated along the arcuate groove, whereby said eyeglasses will safely remain until retrieved.

The eyeglass holder of the invention may be suitably mounted on any surface capable of maintaining the holder in an upright position or may be merely allowed to rest on a table, desk or similar substantially flat surface as in the case of the portable embodiment.

Thus, referring to FIGURE V the eyeglass holder of the present invention may be suitably attached to or incorporated in, along its rear wall portion, a wall tile platform 11 of dimensions corresponding to those of conventional wall tiles, so that the platform containing the holders of the invention may be inserted on a tiled wall, as for example, in a bathroom near a shower or bath fixture, in place of a conventional tile for easy access.

In the preferred embodiment of the invention as may be seen in FIGURE V, a template 7a, substantially conforming to the outline configuration of a pair of glasses and generally defining the edges of the back wall of the face of the wedge block, is conveniently disposed against said back wall 6a. This template may be made of felt, sponge rubber or other similar non-abrasive material whereby to softly cushion the eyeglass lenses resting in the slots against said back wall and prevent scratching of the lenses.

While the foregoing specification and drawing have been set forth to illustrate the invention, it will be understood readily by those skilled in the art, that various changes and modifications may be made without departing from the spirit and scope of the invention which is to be limited only by the appended claims.

I claim:

1. An eyeglass holder comprising a wedge-shaped block having a forward blockface, means defining two arcuately shaped slots in said blockface spaced from one another and in a common plane, including means defining a back wall for said slots, means defining an upstanding projection disposed across the space between said slots, and means defining a bridge seat behind said projection and in front of said back wall.

2. An eyeglass holder as in claim 1, wherein a concave indentation is provided within the back wall portion of each slot, whereby to receive thereagainst the corresponding convex lens portion of a pair of eyeglasses placed in said holder.

3. An eyeglass holder as in claim 1, wherein a template of cushioning material is provided for abutment against the back wall surface whereby to maintain soft cushioning contact with the lenses of a pair of eyeglasses placed within said holder.

4. An eyeglass holder as in claim 1, wherein said means defining an upstanding projection comprises an extension of said blockface across the face portion between said slots.

5. An eyeglass holder as in claim 1, wherein said means defining a bridge seat comprises an extension of said blockface behind said projection and connected to said back wall.

6. An eyeglass holder comprising a wedge-shaped block having a forward face, a bottom face, a rear face and two side faces, two arcuately shaped slots disposed in said forward face, spaced from one another and in a common plane, said slots being defined by a back wall in said forward face, and two arcuately shaped rims disposed in said forward face, an upstanding projection spaced from said back wall and defined by inward extensions of each said rim across the space between said slots in said forward face, and a bridge seat defined by inward extensions of each said slot across the space between said slots and behind said projection and in front of said back wall, whereby to receive within said slots and against said back wall corresponding lenses of a pair of eyeglasses and across said bridge seat the center bridge of said eyeglasses.

7. An eyeglass holder as in claim 6, wherein a concave indentation is provided within the back wall portion of each slot, whereby to receive thereagainst the corresponding convex lens portion of a pair of eyeglasses placed in said holder.

8. An eyeglass holder as in claim 6, wherein a template of cushioning material is provided for abutment against the back wall surface whereby to maintain soft cushioning contact with the lenses of a pair of eyeglasses placed within the holder.

9. An eyeglass holder comprising a wedge-shaped block having a forward blockface, said face inclining in a rearwardly direction with respect to the longitudinal axis of said block, means defining two arcuately shaped slots in said blockface spaced from one another and in a common plane, including means defining a rearwardly inclining back wall for said slots, means defining an upstanding projection disposed across the space between said slots, and means defining a bridge seat behind said projection and in front of said back wall, whereby to receive within said means defining slots and against said means defining a back wall corresponding lenses of a pair of eyeglasses and behind said upstanding projection means and across said means defining a bridge seat the center bridge of said eyeglasses.

10. A portable eyeglass holder comprising a wedge-shaped block having a forward blockface, means defining two arcuately shaped slots in said block face spaced from one another and in a common plane, including means defining a back wall for said slots, means defining an upstanding projection disposed across the space between said slots, and means defining a bridge seat behind said projection and in front of said back wall, whereby to receive on said portable holder and within said means defining said slots and against said means defining a back wall corresponding lenses of a pair of eyeglasses and behind said means defining an upstanding projection and across said means defining a bridge seat the center bridge of said eyeglasses.

11. A tile having an outside surface, and an eyeglass holder comprising a wedge-shaped block having a forward blockface, said face inclining in a rearwardly direction with respect to the longitudinal axis of said block, a substantially vertical rear wall and a bottom wall, means defining two arcuately shaped slots in said blockface spaced from one another and in a common plane, including means defining a rearwardly inclining back wall for said slots, means defining an upstanding projection disposed across the space between said slots, and means defining a bridge seat behind said projection and in front of said back wall, said eyeglass holder being attached to said tile surface along the rear wall of said holder, whereby said tile when positioned on a wall is adapted to receive in said holder and within said means defining slots and against said means defining a back wall corresponding lenses of a pair of eyeglasses and behind said means defining an upstanding projection and across said means defining a bridge seat the center bridge of said eyeglasses.

References Cited in the file of this patent

UNITED STATES PATENTS

| | | |
|---|---|---|
| 1,122,668 | Traurig | Dec. 29, 1914 |
| 2,203,402 | Bausch | June 4, 1940 |
| 2,332,266 | Segal | Oct. 19, 1943 |
| 2,380,297 | Dibert | July 10, 1945 |
| 2,411,361 | Bongiovanni | Nov. 19, 1946 |
| 2,884,220 | Manley | Apr. 28, 1959 |

FOREIGN PATENTS

| | | |
|---|---|---|
| 395,470 | Great Britain | July 20, 1933 |